Patented June 14, 1949

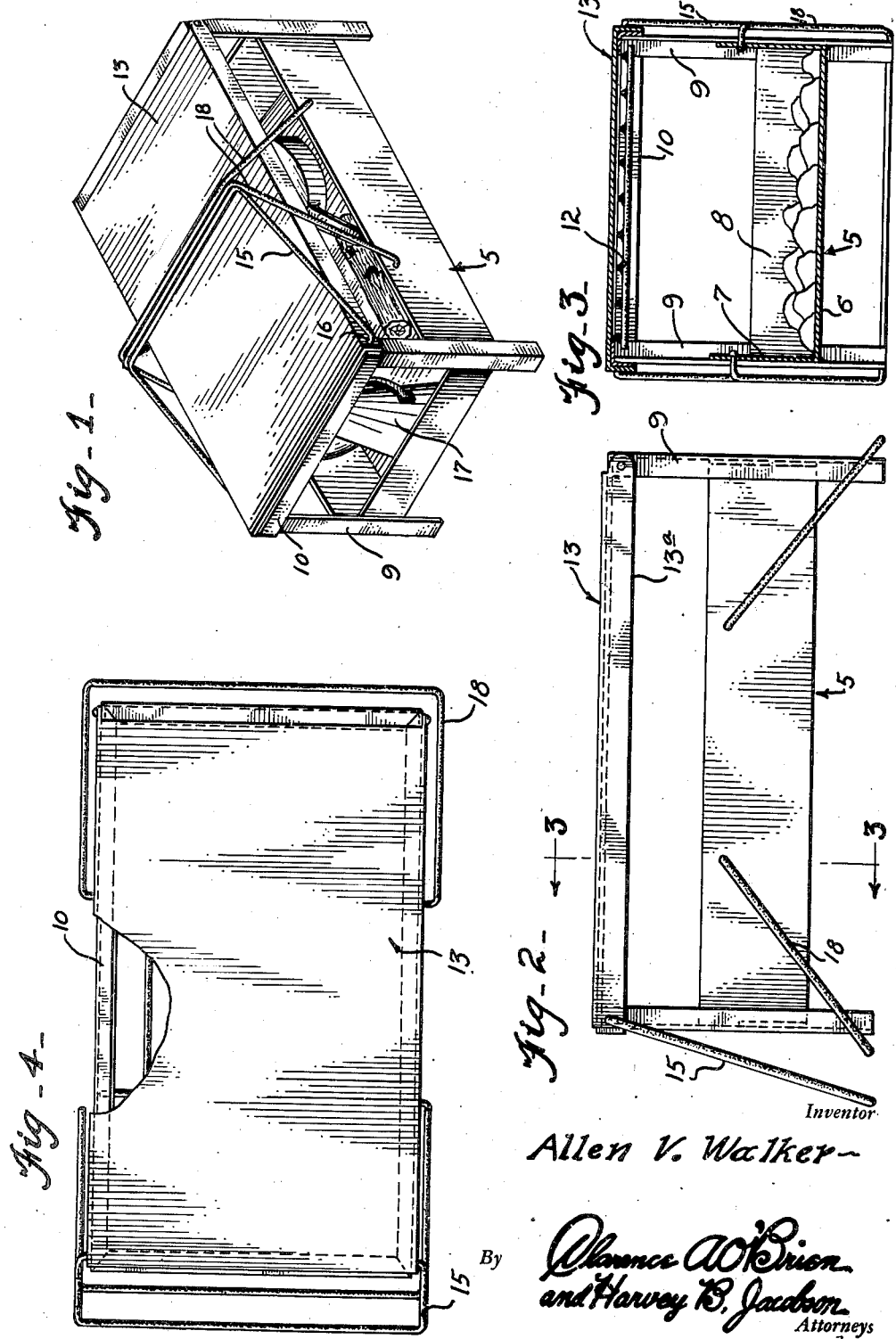

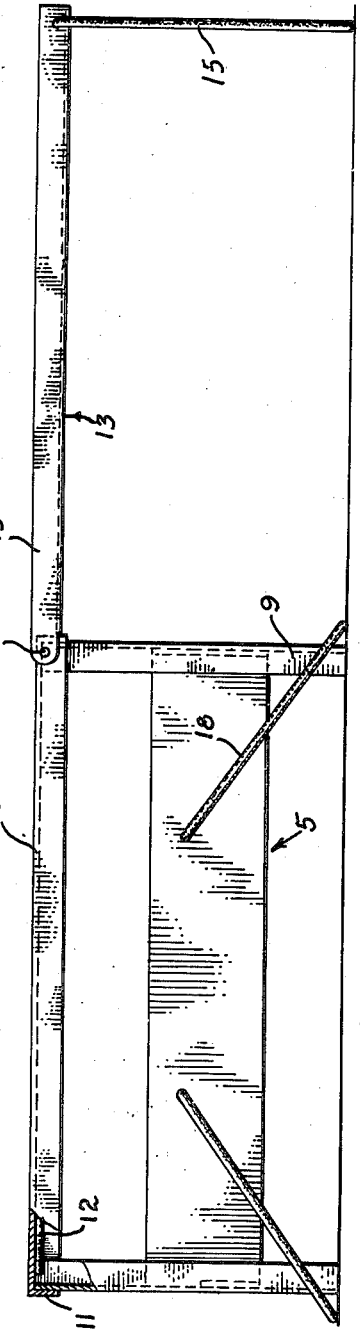

2,473,458

UNITED STATES PATENT OFFICE 2,473,458

PORTABLE OUTDOOR COOKING STOVE

Allen Vinson Walker, Nashville, Tenn.

Application January 5, 1946, Serial No. 639,325

1 Claim. (Cl. 126—25)

The present invention relates to new and useful improvements in cooking stoves and more particularly to a portable outdoor stove of this character adapted for use by campers and others for use for cooking purposes out-of-doors.

An importance object of the present invention is to provide a cooking stove of this character embodying a grate in the form of a tray, or fire pot, supported by legs in an elevated position above the ground and adapted for holding the fuel, such as wood, charcoal, or the like, and also providing a removable grill supported on the top of the legs above the grate and on which the food may be cooked.

A further important object of invention is to provide a combined grill and table removably mounted on the legs of the stove and in which the grill and table are pivotally connected to each other with the table adapted for swinging horizontally outwardly at one end of the grill and supported in its open position on foldable legs, the table being adapted for swinging into position on top of the grill for covering the same to also be used for cooking flap-jacks and other food as well as to provide a cover for the grill and grate while the stove is being transported or not in use.

Another object of invention is to provide a tray-like grate for the stove providing storage means for pots, pans and similar cooking equipment to be conveniently transported and stored with the stove.

A further object of invention is to provide a device of this character of simple and practical construction, which is neat and attractive in appearance, relatively inexpensive to manufacture and otherwise well adapted to the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view.

Figure 2 is a side elevational view with the table in folded position.

Figure 3 is a transverse sectional view taken on a line 3—3 of Figure 2.

Figure 4 is a top plan view with the table in folded position and with parts broken away and shown in section.

Figure 5 is a side elevational view with the table shown in open position and with parts broken away and shown in section.

Figure 6 is a fragmentary top plan view with the table in open position, and

Figure 7 is a side elevational view of the removable grill and table and with parts broken away and shown in section.

Referring now to the drawings in detail wherein for the purpose of illustration I have disclosed a preferred embodiment of invention, the numeral 5 designates the grate which is constructed of sheet metal to form a tray, or fire pot, including a bottom 6, side walls 7 and end walls 8, one of the end walls being relatively low to facilitate placing of fuel, such as charcoal, wood or the like on the grate.

The corners of the grate are supported by angle iron legs 9 which extend above and below the grate, the lower ends of the legs supporting the grate in an elevated position above the ground.

A grill 10 of open frame construction and composed of angle iron side and end frame members 11 is supported on the upper ends of the legs 9, the grill including spaced parallel longitudinal and transverse rods 12 welded, or otherwise secured, at their ends to the underside of the frame members 11.

A sheet metal folding table 13 is constructed with flanges 13a at its longitudinal side edges, one end of the flanges projecting beyond the table for positioning outwardly at the sides of the grill 10 for pivotal connection thereto by pins 14, the flanges 13a projecting upwardly when the table is in its open position as shown in Figures 5 and 6 of the drawings.

A folding leg 15 of U-shaped construction has its ends bent inwardly as shown at 16 for pivotally connecting the same to the flanges 13 at the free ends of the table, the leg supporting the table in a horizontal position at one end of the stove when the table is in its open position, and the table is adapted to swing upwardly on top of the grill 10 into its folded position to cover the grill 10 as shown in Figures 1 to 4 inclusive.

The rods 12 of the grill 10 are adapted to support food thereon to be grilled by the burning of the fuel on the grate 5 beneath the grill and the table 13 may also be moved into its folded position on top of the grill 10 to be also used as a plate grill for cooking flap-jacks or other foods.

When the stove is not in use, cooking utensils, such as shown at 17 or other camping equipment may be placed on the grate 5 for convenient transportation or storage purposes and to the sides 7 of the grate a pair of U-shaped handles 18 are pivotally attached at the ends thereof upon opposite sides of the transverse center of said grate and adapted for swinging upwardly into converging relation across the top of the stove in straddling relation thereto to provide means for conveniently carrying the stove.

When the table 13 is folded, the folding leg 15 therefor may be swung upwardly thereover to converge toward the pair of upswung handles 18 for grasping therewith, whereby to hold said table 13 folded while the stove is being carried.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What I claim is:

An outdoor cooking stove comprising an open fire pot, having corner legs for supporting the same on the ground in elevated position, said legs extending above said pot, a grill unit supported on top of the legs above the fire pot and including an open grill member, a combined folding plate grill and table pivoted at one end on the open grill member for swinging into and out of folded position and resting in the folded position on top of said grill member, a pair of U-shaped handles pivoted at ends thereof to opposite sides of the fire pot upon opposite sides of the transverse center thereof for swinging into upwardly converging relation to straddle said pot, grill unit and said folding plate and grill in the folded position thereof to provide for grasping of said handles by one hand to carry the stove, and a U-shaped leg structure on the other end of said folding plate grill and table pivoted thereon for swinging upwardly thereover in the folded position thereof to converge toward said pair of handles for grasping therewith to hold said folding plate grill and table in folded position while the stove is being carried.

ALLEN VINSON WALKER.

REFERENCES CITED

The following references are of record in the file of this patent:

UNITED STATES PATENTS

| Number | Name | Date |
|---|---|---|
| 1,438,345 | Tait | Dec. 12, 1922 |
| 1,454,385 | Higham | May 8, 1923 |
| 1,540,434 | Stone | Jan. 2, 1925 |
| 2,152,168 | Anderson | Mar. 28, 1939 |
| 2,334,847 | Spiers | Nov. 23, 1943 |
| 2,403,134 | Stephenson | July 2, 1946 |

FOREIGN PATENTS

| Number | Country | Date |
|---|---|---|
| 47,970 | Sweden | Apr. 5, 1918 |